(12) United States Patent
Marwaha et al.

(10) Patent No.: US 10,669,988 B2
(45) Date of Patent: Jun. 2, 2020

(54) SYSTEM AND METHOD FOR OPERATING WIND TURBINES TO AVOID STALL DURING DERATING

(71) Applicant: General Electric Company, Schenectady, NY (US)

(72) Inventors: Monika Marwaha, Bangalore (IN); Nadine Schuell, Laurens, SC (US); Pranav Soni, Indore (IN); Gert Torbohm, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/728,534

(22) Filed: Oct. 10, 2017

(65) Prior Publication Data

US 2019/0107102 A1   Apr. 11, 2019

(51) Int. Cl.
| | | |
|---|---|---|
| F03D 7/02 | (2006.01) | |
| F03D 7/04 | (2006.01) | |
| F03D 1/06 | (2006.01) | |
| G05B 19/042 | (2006.01) | |

(52) U.S. Cl.
CPC ........... *F03D 7/0256* (2013.01); *F03D 7/028* (2013.01); *F03D 7/0224* (2013.01); *F03D 7/047* (2013.01); *G05B 19/042* (2013.01); *F03D 1/06* (2013.01); *F05B 2270/323* (2013.01); *F05B 2270/324* (2013.01); *F05B 2270/325* (2013.01); *G05B 2219/2619* (2013.01)

(58) Field of Classification Search
CPC .................................................. F03D 7/0256
See application file for complete search history.

(56) References Cited

U.S. PATENT DOCUMENTS

| | | | |
|---|---|---|---|
| 2008/0112807 A1* | 5/2008 | Uphues | F03D 7/0224 416/1 |
| 2010/0101328 A1* | 4/2010 | Enevoldsen | F03D 7/0224 73/714 |
| 2013/0108443 A1 | 5/2013 | Uphues et al. | |
| 2013/0214535 A1 | 8/2013 | Brath | |
| 2013/0259682 A1* | 10/2013 | Kammer | F03D 7/0244 416/1 |

(Continued)

OTHER PUBLICATIONS

Ameet S. Deshpande, et al: Wind Turbine Controller Design Considerations for Improved Wind Farm Level Curtailment Tracking 2012 IEEE Power and Energy Society General Meeting; San Diego, CA, USA; Jul. 22-26, 2012.

(Continued)

*Primary Examiner* — Thomas C Lee
*Assistant Examiner* — Charles Cai
(74) *Attorney, Agent, or Firm* — Dority & Manning, P.A.

(57) ABSTRACT

A method for operating a wind turbine to avoid stall during derating thereof includes providing an initial pitch setting for one or more rotor blades of the wind turbine. Further, the method includes operating the wind turbine based on a rated power curve with the one or more rotor blades fixed at the initial pitch setting. Further, the method includes identifying at least one condition of the wind turbine that is indicative of stall. The method also includes derating the wind turbine. Further, the method includes modifying the initial pitch setting to an updated pitch setting when the at least one condition is identified.

17 Claims, 5 Drawing Sheets

(56) References Cited

U.S. PATENT DOCUMENTS

| | | | | |
|---|---|---|---|---|
| 2014/0003938 A1* | 1/2014 | Esbensen | ............. | F03D 7/0224 |
| | | | | 416/1 |
| 2014/0322015 A1* | 10/2014 | Kyrazis | .................. | B64C 11/30 |
| | | | | 416/147 |
| 2015/0093242 A1* | 4/2015 | Enevoldsen | ............ | F03D 7/046 |
| | | | | 416/1 |
| 2015/0159625 A1 | 6/2015 | Hardwicke, Jr. et al. | | |
| 2016/0123304 A1* | 5/2016 | Kibsgaard | ............. | F03D 7/0224 |
| | | | | 416/1 |
| 2018/0171979 A1* | 6/2018 | Spruce | .................. | F03D 7/0292 |

OTHER PUBLICATIONS

European Search Report, dated Mar. 7, 2019.

\* cited by examiner

SYSTEM AND METHOD FOR OPERATING WIND TURBINES TO AVOID STALL DURING DERATING

FIELD

The present invention relates generally to wind turbines, and more particularly, to systems and methods for operating wind turbines to avoid stall during derating.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a "trip limit" or "monitor set point limit," the wind turbine may implement a control action, such as shutting down or de-rating the wind turbine in order to protect wind turbine components from damage.

Additional instances may also exist in which a wind turbine may need to be de-rated. Such derating is typically achieved by reducing either the torque or speed set points of the wind turbine. For example, if a load monitoring system of the turbine is inoperable (e.g. due to installation, maintenance, repair, and/or replacement), the wind turbine should be de-rated to mitigate loads. Though derating the speed may mitigate loads, such derating may also lead to stall especially in low air density conditions.

Accordingly, systems and methods for operating wind turbines to avoid stall during derating would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine to avoid stall during derating thereof. The method includes providing an initial pitch setting for one or more rotor blades of the wind turbine. Further, the method includes operating the wind turbine based on a rated power curve with the one or more rotor blades fixed at the initial pitch setting. Moreover, the method includes identifying at least one condition of the wind turbine that is indicative of stall. The method also includes derating the wind turbine. In addition, the method includes modifying the initial pitch setting to an updated pitch setting when the at least one condition is identified.

In one embodiment, the condition(s) of the wind turbine may include an environmental condition or an operating condition thereof. In further embodiments, the condition(s) of the wind turbine may be monitored via one or more sensors. More specifically, in one embodiment, the environmental condition(s) may include air density, air moisture, humidity, pressure, or temperature. In such embodiments, the method may include modifying the initial pitch setting to the updated pitch setting when the air density is below a predetermined threshold.

In alternative embodiments, the operating condition(s) of the wind turbine may include a sensor system condition. In such embodiments, the method may further include modifying the initial pitch setting to the updated pitch setting when the sensor system condition of the wind turbine indicates a failure.

In another embodiment, the step of derating the wind turbine may include reducing a speed set point or a torque set point of the wind turbine. In several embodiments, the step of modifying the initial pitch setting to the updated pitch setting may include pitching the one or more rotor blades towards feather.

In additional embodiments, the method may include determining the updated pitch setting based on at least one of power or thrust of the wind turbine. In further embodiments, the method may also include modifying the initial pitch setting to the updated pitch setting via at least one of a table or a function.

In another aspect, the present disclosure is directed to a method for operating a wind turbine to avoid stall during derating thereof. The method includes monitoring at least one condition of the wind turbine. Further, the method includes derating the wind turbine. Moreover, the method includes changing an angle of attack of one or more of the rotor blades when the at least one condition indicates a likelihood of stall. The method may also include any of the additional features and/or steps as described herein.

In yet another aspect, the present disclosure is directed to a system for operating a wind turbine to avoid stall during derating thereof. The system includes one or more sensors configured to identify a condition of the wind turbine that is indicative of stall and a processor communicatively coupled to the one or more sensors. The processor(s) is configured to perform one or more operations, including but not limited to providing an initial pitch setting for one or more rotor blades of the wind turbine, operating the wind turbine based on a rated power curve with the one or more rotor blades fixed at the initial pitch setting, derating the wind turbine, and modifying the initial pitch setting to an updated pitch setting when the at least one condition is identified. The system may also include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
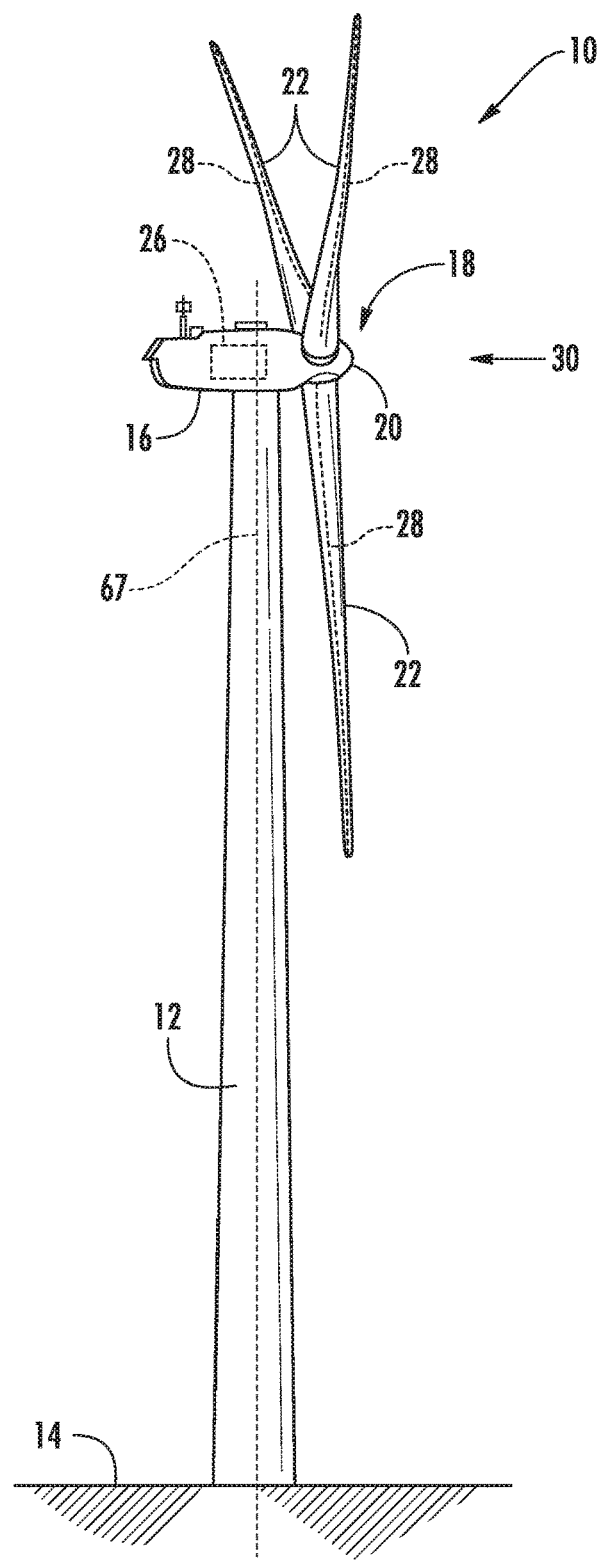
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. For example, as shown, the turbine controller 26 is located in the top box cabinet. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
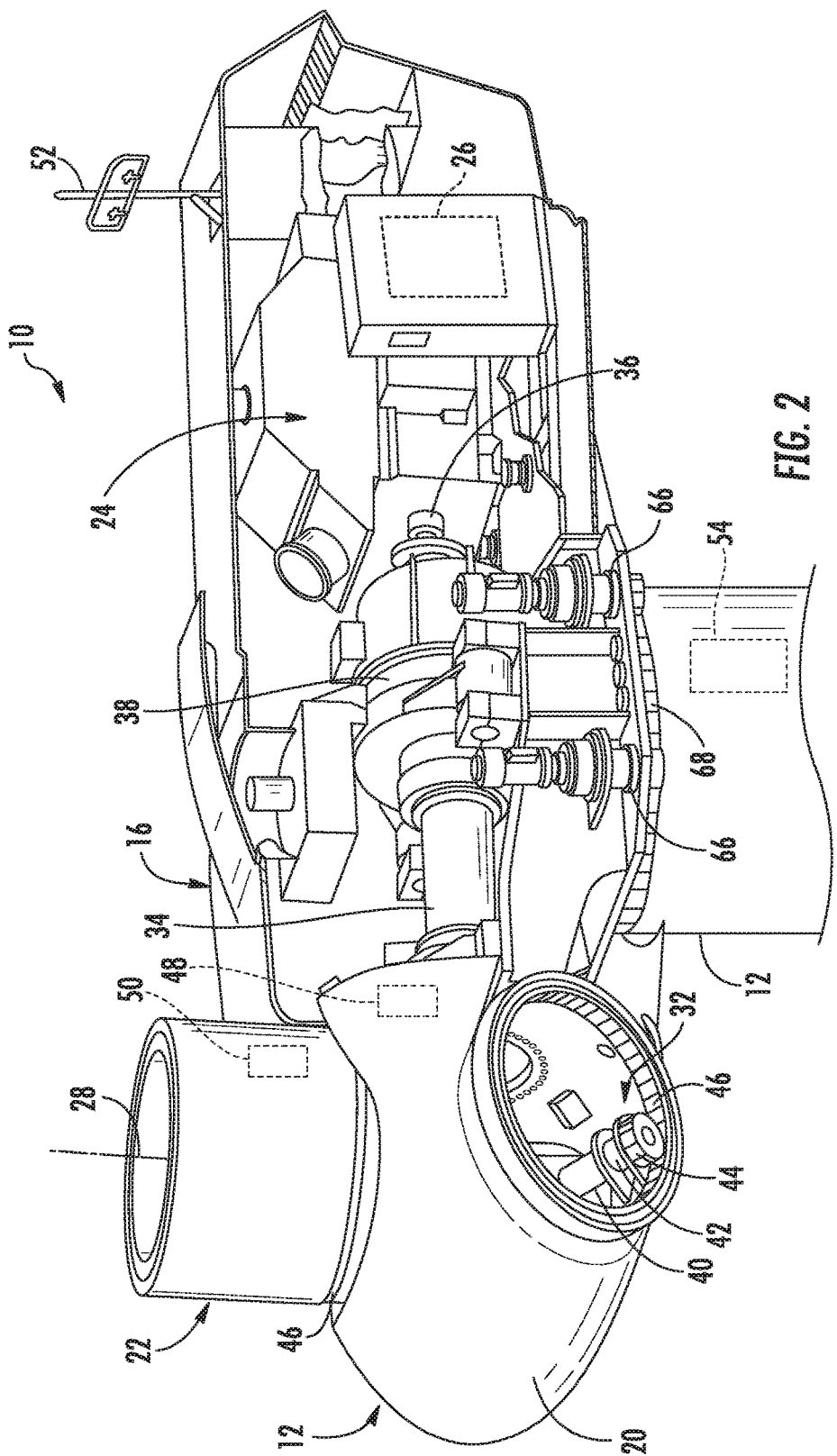
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Still referring to FIG. 2, each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind direction 30 (e.g., by engaging a yaw bearing 68 of the wind turbine 10 so as to rotate the nacelle 16 about a yaw axis 67 (FIG. 1)).

The wind turbine 10 may also include a sensor system 64 having one or more sensors 48, 50, 52, 54 for measuring various operating, wind, and/or environmental parameters of the wind turbine 10. For example, as shown in FIG. 2, a sensor(s) 48 may be located on the hub 20 so as to measure hub loads of the wind turbine 10. In addition, a sensor(s) 50 may be located on one or more of the rotor blades 22 so as to measure loads thereof. Further, a sensor(s) 54 may be located on the tower 12 of the wind turbine 10 to measure loads thereof. Moreover, the wind turbine 10 may include one or more wind or environmental sensors 52 for measuring various wind and/or environmental parameters of the wind turbine 10. For example, such parameter(s) may include wind gusts, wind speed, wind direction, wind acceleration, wind turbulence, wind shear, wind veer, wake, or similar, as well as air density, air moisture, humidity, pressure, temperature, or any other environmental condition.

In alternative embodiments, the sensors 48, 50, 52, 54 may be any other suitable sensors capable of measuring operating and/or wind parameters of the wind turbine 10. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 50, 52, 54 may, for example, be used to generate signals relating to the parameter being monitored, which can then be utilized by the controller 26 to determine the actual condition.

Figure 3:
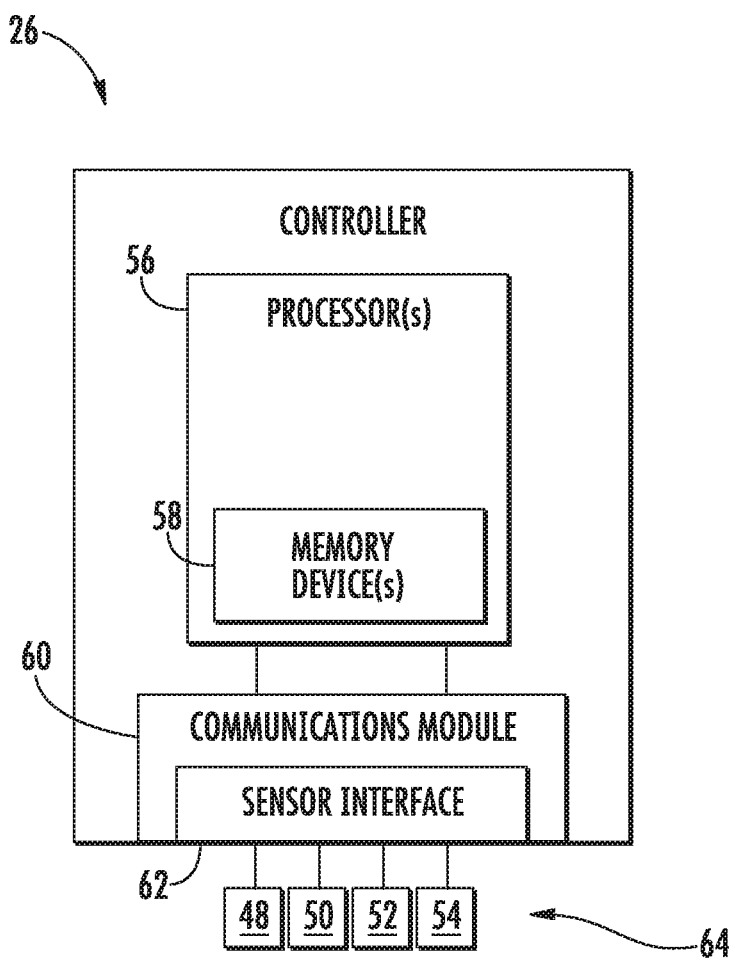
FIG. 3 illustrates a schematic diagram of one embodiment of a controller according to the present disclosure.

Referring specifically to FIG. 3, there is illustrated a block diagram of one embodiment of the controller 26 according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from the sensors 48, 50, 52, 54 to be converted into signals that can be understood and processed by the processors 56. It should be appreciated that the sensors 48, 50, 52, 54 may be communicatively coupled to the communications module 60 using any suitable means. For example, as shown in FIG. 3, the sensors 48, 50, 52, 54 are coupled to the sensor interface 62 via a wired connection. However, in other embodiments, the sensors 48, 50, 52, 54 may be coupled to the sensor interface 62 via a wireless connection, such as by using any suitable wireless communications protocol known in the art. As such, the processor 56 may be configured to receive one or more signals from the sensors 48, 50, 52, 54.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 58, configure the controller 26 to perform various functions including, but not limited to, estimating one or more wind parameters of the wind turbine 10 based on the plurality of operating data, transmitting suitable control signals to implement control actions in response to the detection of transient wind conditions and various other suitable computer-implemented functions.

Figure 4:
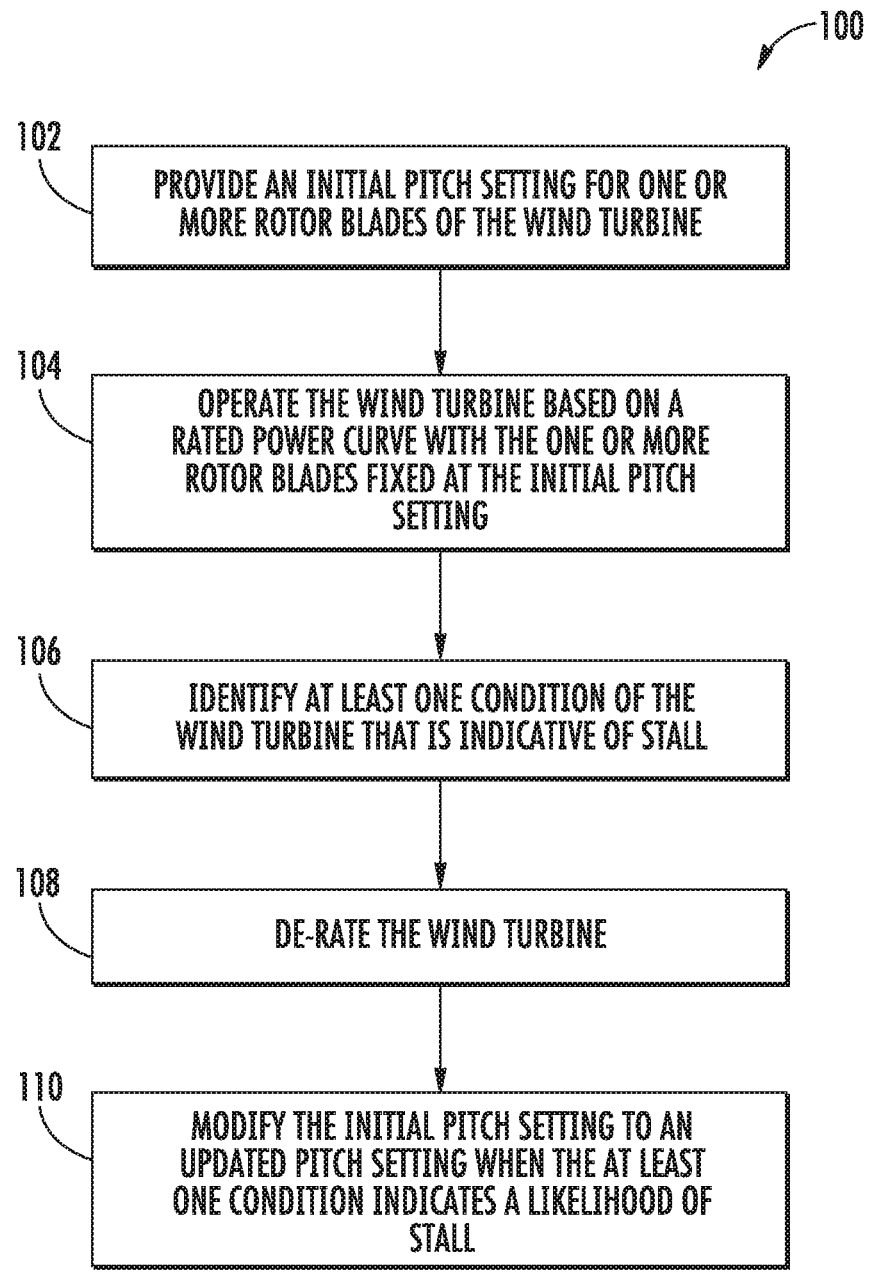
FIG. 4 illustrates a flow diagram of one embodiment of a method for operating a wind turbine to avoid stall during derating thereof according to the present disclosure.
Figure 5:
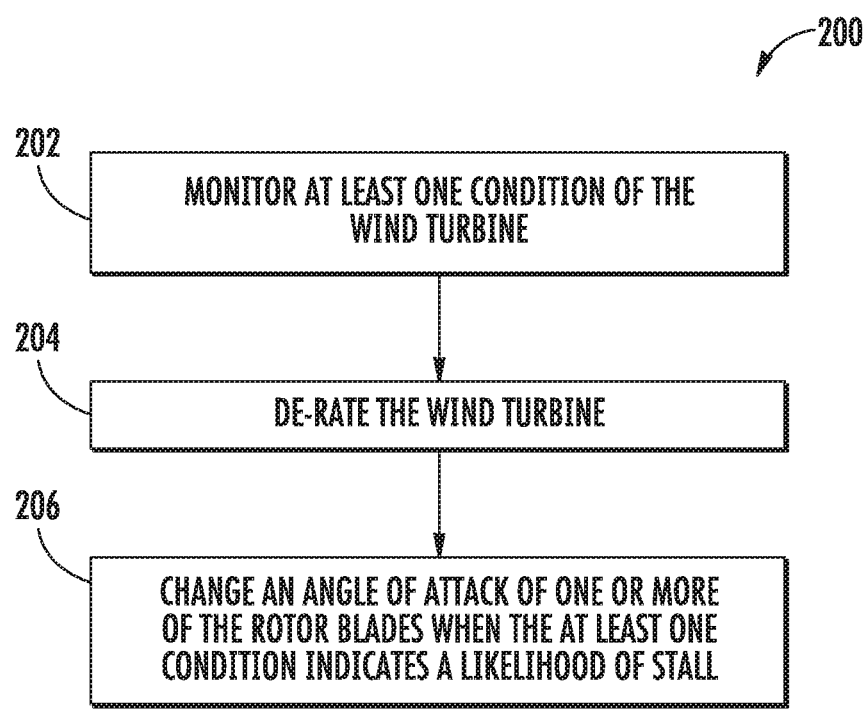
FIG. 5 illustrates a flow diagram of another embodiment of a method for operating a wind turbine to avoid stall during derating thereof according to the present disclosure.

Referring now to FIGS. 4-5, several flow diagrams of methods for operating the wind turbine 10 to avoid stall during derating thereof are illustrated. More specifically, as shown in FIG. 4 at 102, the method 100 includes providing an initial pitch setting for one or more rotor blades 22 of the wind turbine 10. For example, the initial pitch setting is generally set closer to a power position (i.e. between about −10 degrees to about 0 degrees). As shown at 104, the method 100 includes operating the wind turbine 10 based on a rated power curve with the rotor blade(s) 22 fixed at the initial pitch setting.

As shown at 106, the method 100 includes identifying at least one condition of the wind turbine 10 that is indicative of stall. More specifically, in one embodiment, the condition(s) of the wind turbine 10 may include environmental and/or operating conditions thereof. Further, as mentioned, such conditions may be monitored the sensors 48, 50, 52, 54. The environmental condition(s) described herein may include air density, air moisture, humidity, pressure, temperature, or any other environmental condition. Further, the operating condition(s) of the wind turbine 10 may include any suitable operational parameters thereof. In one embodiment, for example, the operating condition may correspond to a sensor system 64 condition.

Referring still to FIG. 4, as shown at 108, the method 100 also includes derating the wind turbine 10 so as to permit the loads acting on or more of the wind turbine components to be reduced or otherwise controlled. As used herein, derating the wind turbine 10 may include speed de-rating, torque de-rating or a combination of both. Further, the wind turbine 10 may be de-rated by reducing speed and increasing torque, which can be beneficial so as to maintain power. In another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 16 to change the angle of the nacelle 16 relative to the direction of the wind 30. In other embodiments, the controller 26 may be configured to actuate one or more mechanical brake(s) or activate an airflow modifying element on a rotor blade in order to reduce the rotational speed and/or load of the rotor blades 14, thereby reducing component loading. In still further embodiments, the controller 26 may be configured to perform any appropriate control action known in the art. Further, the controller 26 may implement a combination of two or more control actions.

Referring still to FIG. 4, as shown at 110, the method 100 includes modifying the initial pitch setting to an updated pitch setting when the monitored condition(s) is identified. As such, derating the wind turbine 10 does not cause stall as seen in prior art control systems due to the updated pitch settings. In one embodiment, the updated pitch settings may change with power, estimated thrust, and/or estimated loads. For example, in one embodiment, the sensors 48, 50, 52, 54 may determine that certain cold weather conditions exist or a fault message from the sensor system 64 may be received, both of which may present situations prone to stall. As used herein, wind turbine blade "stall" generally refers to the phenomenon that occurs when the boundary layer separates closer to the leading edge of the rotor blade (rather than the trailing edge) thereby causing a wake to flow over the upper surface of the airfoil which reduces lift and increases drag. As such, the use of different pitch settings in areas where the wind turbine 10 is prone to stall while derating via speed maintains the angle of attack lower than angle of attack at stall. In additional embodiments, the method 100 may further include modifying the initial pitch setting to the updated pitch setting when the sensor system 64 condition of the wind turbine 10 indicates a failure (i.e. the sensor system 64 is non-operational and loads cannot be detected).

More specifically, in one embodiment, the method 100 may include modifying the initial pitch setting to the updated pitch setting when the air density is below a predetermined threshold. In further embodiments, the method 100 may include modifying the initial pitch setting to the updated pitch setting when the ambient temperature is low, e.g. from about −30° C. to about 15° C. In such conditions, the controller 26 is configured to modify the pitch angle of one or more of the rotor blades 22 from a power position towards a feather position. As used herein, feathering the rotor blades 22 generally encompasses increasing the pitch angles thereof by rotating the blades 22 to be closer to parallel to the airflow. As such, a fully feathered rotor blade includes pitch angles close to about 90 degrees with respect to the wind 30.

The controller 26 may be configured to modify the initial pitch setting to the updated pitch setting in various ways. For example, in one embodiment, the controller 26 may be configured to modify the initial pitch setting to the updated pitch setting via a table or a function. In such embodiments, the pitch, as a function of power, thrust, or any similar estimated sensor, can be fed into the controller 26.

Referring now to FIG. 5, a flow diagram of another embodiment of a method 200 for operating the wind turbine 10 to avoid stall during derating thereof is illustrated. As shown at 202, the method 200 includes monitoring at least one condition of the wind turbine. As shown at 204, the method 200 includes derating the wind turbine 10, i.e. using any of the suitable derating methods described herein. As shown at 206, the method 200 also includes changing an angle of attack of one or more of the rotor blades 22 when the at least one condition indicates a likelihood of stall. For example, in one embodiment, the angle of attack of the rotor blades 22 may be changed by pitching the rotor blades 22 towards a feather position during normal operation.

It should also be appreciated that an advantage of the present invention is that the system and method may be implemented using existing components of the wind turbine 10. As such, a user is not required to purchase, install, and maintain new equipment. Further, the controller 26 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine to avoid stall during derating thereof, the method comprising:
   providing an initial pitch setting for one or more rotor blades of the wind turbine;
   operating the wind turbine based on a rated power curve with the one or more rotor blades fixed at the initial pitch setting;
   identifying at least one condition of the wind turbine that is indicative of stall;
   in response to identifying the at least one condition of the wind turbine that is indicative of stall,
      modifying the initial pitch setting to an updated pitch setting when the at least one condition is identified while reducing a speed set point of a generator of the wind turbine, wherein using the updated pitch setting in response to identifying the at least one condition of the wind turbine that is indicative of stall while derating via speed maintains an angle of attack of the one or more rotor blades lower than an angle of attack at stall.

2. The method of claim 1, wherein the at least one condition comprises at least one of an environmental condition or an operating condition of the wind turbine.

3. The method of claim 2, wherein the at least one environmental condition comprises at least one of air density, air moisture, humidity, pressure, or temperature.

4. The method of claim 3, further comprising modifying the initial pitch setting to the updated pitch setting when the air density is below a predetermined threshold.

5. The method of claim 1, further comprising monitoring the at least one condition of the wind turbine via one or more sensors.

6. The method of claim 2, wherein the operating condition of the wind turbine comprises a sensor system condition.

7. The method of claim 6, further comprising modifying the initial pitch setting to the updated pitch setting when the sensor system condition of the wind turbine indicates a failure.

8. The method of claim 1, wherein modifying the initial pitch setting to the updated pitch setting further comprises pitching the one or more rotor blades towards feather.

9. The method of claim 1, further comprising determining the updated pitch setting based on at least one of power or thrust of the wind turbine.

10. The method of claim 1, further comprising modifying the initial pitch setting to the updated pitch setting via at least one of a table or a function.

11. A method for operating a wind turbine to avoid stall during derating thereof, the method comprising:
    monitoring at least one condition of the wind turbine;
    pitching one or more rotor blades of the wind turbine towards feather to change an angle of attack of the one or more rotor blades when the at least one condition indicates a likelihood of stall while derating; and
    reducing a speed set point of a generator of the wind turbine, wherein pitching the one or more rotor blades towards feather to change the angle of attack of the one or more rotor blades when the at least one condition indicates a likelihood of stall while derating via speed maintains the angle of attack of the one or more rotor blades lower than an angle of attack at stall to avoid while derating.

12. A system for operating a wind turbine to avoid stall during derating thereof, the system comprising:
    one or more sensors configured to identify a condition of the wind turbine that is indicative of stall;
    a processor communicatively coupled to the one or more sensors, the processor configured to perform one or more operations, the one or more operations comprising:

providing an initial pitch setting for one or more rotor blades of the wind turbine;

operating the wind turbine based on a rated power curve with the one or more rotor blades fixed at the initial pitch setting;

in response to identifying the one condition of the wind turbine that is indicative of stall, modifying the initial pitch setting to an updated pitch setting when the condition is identified while reducing a speed set point of a generator of the wind turbine, wherein using the updated pitch setting in response to identifying the at least one condition of the wind turbine that is indicative of stall while derating via speed maintains an angle of attack of the one or more rotor blades lower than an angle of attack at stall.

13. The system of claim 12, wherein the at least one condition comprises at least one of an environmental condition or an operating condition of the wind turbine.

14. The system of claim 13, wherein the at least one environmental condition comprises at least one of air density, air moisture, humidity, pressure, or temperature, and wherein the operating condition of the wind turbine comprises a sensor system condition.

15. The system of claim 14, wherein the one or more operations further comprise modifying the initial pitch setting to the updated pitch setting when the air density is below a predetermined threshold.

16. The system of claim 14, wherein the one or more operations further comprise modifying the initial pitch setting to the updated pitch setting when the sensor system condition of the wind turbine indicates a failure.

17. The system of claim 12, wherein the one or more operations further comprise determining the updated pitch setting based on at least one of power or thrust of the wind turbine.

* * * * *